A. C. COUPLED GATE CIRCUITS

Filed April 21, 1954

INVENTORS: R. E. GRAHAM
E. R. KRETZMER

BY Hugh S. Wertz
ATTORNEY 2,802,954

A. C. COUPLED GATE CIRCUITS

Robert E. Graham, Chatham Township, Morris County, and Ernest R. Kretzmer, New Providence, N. J., assignors to Bell Telephone Laboratories, Incorporated, New York, N. Y., a corporation of New York Application April 21, 1954, Serial No. 424,608

3 Claims. (Cl. 307—88.5)

This invention relates to actuating circuits and more particularly to actuating circuits of the gate type employing asymmetrically conducting devices which transfer electrical energy by means of applied control voltages.

A gating circuit can be characterized as a circuit positioned between a source of input waves and a wave utilization device which is adapted to transmit waves from the source to the wave utilization device during intervals determined by an external control voltage pulse. Inasmuch as the circuit transmits only during given time intervals, it is said to constitute a switch or a "gate" which is "on" during the transmission period and "off" at all other times.

In some actuated electronic circuits, notably in "clock" circuits, that is, circuits that perform a timing function, and "count" circuits, that is, circuits that register the occurrence of certain signals, it is necessary that the actuating signals applied thereto be individual and brief. Often, however, the occurring signal from which the timing function is to be measured, or which is to be registered as a count, is of low power content or of such a continuing duration that the signal is not suited for actuating purposes. In any of these instances it becomes necessary to provide some additional circuitry for performing the actuating function.

One such piece of additional circuitry that has been used is in auxiliary multivibrator adapted to generate a suitable actuating pulse from the occurring signal. This solution has not proved entirely satisfactory because of the disadvantages of the additional equipment required and of the unnecessary power demands imposed upon the system by the use of such equipment. An ideal method for meeting this problem is to apply an actuating signal by means of a gate circuit controlled by the occurring signal. Heretofore, however, the art has not provided simple gating means for deriving from each occurring signal an output pulse suitable for actuating uses having a duration which is substantially independent of the duty cycle and duration of the occurring signal.

It is an object of this invention to provide a simple gate circuit adapted to overcome the above problem.

The invention, in one embodiment, contemplates a gate circuit including an asymmetrically conducting device having a high impedance direction and a low impedance direction of current flow and which is normally biased in its high impedance or "off" condition by an external source. A control voltage signal applied to the conducting device through a charging capacitor establishes a new voltage on the plates of the capacitor, thus biasing the device in its low impedance or "on" condition. The "on" condition persists for the interval required to charge the capacitor to the new equilibrium potential established across the plates thereof by the control voltage. With the completion of the charging cycle the high impedance bias is re-established and the device is "off." A second asymmetrically conducting device is associated with the capacitor to provide a current path thereto for controlling the duration of a charging cycle.

One important advantage of this arrangement is that the duration of the "on" period of the gate is substantially independent of the duration of the control voltage signal but is determined by the time constant of the charging capacitor and the impedance associated with its charging path.

Another important advantage is that the second asymmetrically conducting device provides an auxiliary low impedance current path to the capacitor which quickly subdues the disabling bias that tends to persist when the control voltage signal is removed and thereby makes the first asymmetrically conducting device quickly receptive to succeeding control signals.

The invention, its objects and advantages will be better understood by referring to the following description and the drawing forming a part thereof wherein.

Figure 1:
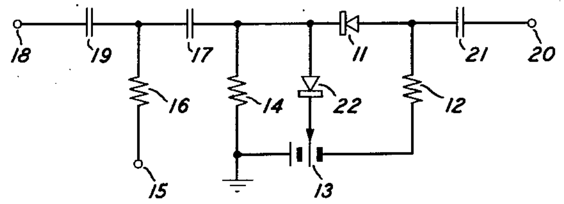
Fig. 1 is a circuit diagram in schematic form of a gate circuit in accordance with the invention.

Referring specifically to Fig. 1, there is shown therein a schematic diagram of an exemplary gate circuit in accordance with the invention. A diode 11 has a retarding bias placed across its electrodes by resistor 12 connected between the anode and the negative terminal of a source 13 and a resistor 14 connected between the cathode and the positive terminal of source 13. A control input signal is applied to the gate circuit at terminal 15 which is connected to the cathode of diode 11 through a control input resistor 16 and a charging capacitor 17. Input terminal 18 is coupled to capacitor 17 through the direct current blocking capacitor 19 and the output terminal 20 is coupled to the anode of diode 11 through a direct current blocking capacitor 21. A further diode 22 is connected to provide a current flow from the cathode of diode 11 to an intermediate terminal in source 13.

Figure 2A:
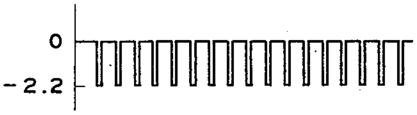
Figs. 2A, 2B, 2C and 2D show wave forms occurring at various points in the circuit of Fig. 1.
Figure 2B:
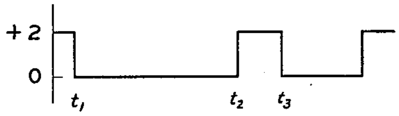
Figure 2C:
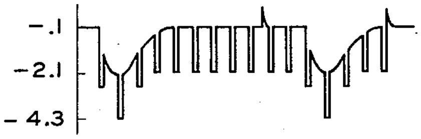
Figure 2D:
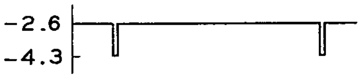

The operation of the circuit will be understood by reference to Figs. 2A, 2B, 2C and 2D. Due to the retarding bias thereacross the diode 11 is normally held "off" thereby preventing a flow of the pulses shown in Fig. 2A from input terminal 18 to output terminal 20. However, with the application of the control signal as shown in Fig. 2B to the terminal 15, at time $t_1$ there is applied to diode 11 a transient forward bias voltage having the pulses of Fig. 2A superimposed thereon as shown in Fig. 2C. The portions of the superimposed input pulses which extend beyond the level of the retarding bias are transmitted through diode 11 to the output terminal 20 as shown in Fig. 2D. It can readily be seen from the foregoing and by reference to Figs. 1 and 2 that the period that the gate is "on" is independent of the duration of the control pulses or the input pulses. The "on" period of the gate is determined by the time constant of the charging cycle of capacitor 17. Proper selection of this time constant relative to the pulse duration insures that the gate will be "on" for a length of time sufficient to pass at least one triggering pulse. Such an arrangement obviously places a negligible power drain on the source of control pulses, which is a highly desirable result in low power circuits such as transistor circuits.

Because of the alternating current coupling of the control signals to the diode 11, it is clear that when the control signal is removed at time $t_2$ a new transient voltage is applied to the diode 11 which turns the gate "hard" off. Before the gate can be again turned on, it is necessary that time be allowed from the capacitor to be recharged to its original equilibrium potential, that is, for the circuit to be "cocked." The diode 22 connected in the circuit provides a low resistance charging path for the capacitor which rapidly cocks the circuit after the control signal is removed. This rapid cocking quickly subdues the transient at time $t_2$ as shown in Fig. 2C thereby establishing the circuit ready to receive the enabling control signal at time $t_3$ as shown in Fig. 2B. The diodes found to be well suited for use in the circuit are those of the silicon junction type which show appreciable conduction only when the bias in the low impedance direction exceeds 0.5 or 0.6 volt. Because of this characteristic the diode 22 is returned to a selected voltage in source 13 which tends to overcome this barrier voltage yet permits the diode to draw very little current in the normal operation of the gate thereby producing an insignificant effect upon operation of the gate diode.

This gate circuit is particularly well adapted for use in systems where the control signal does not have sufficient power content to perform a triggering action itself. In such a circuit the control signal is used to gate input signals therethrough which are in themselves not of sufficient power to perform a triggering function. The input signal consists of a train of low duty cycle pulses whose amplitude and duration are such as to readily trigger the circuit connected to the output of the gate when the retarding bias on the diode is removed. In order for a gate circuit to operate in the described manner, three considerations for the input signal must be met. The first consideration is that the repetition frequency of the pulses be sufficiently high that it is not important which particular pulse accomplishes the triggering action but rather that the triggering may be accomplished by any one of a number of pulses occurring during the period when the retarding bias is removed. A second consideration is that the pulse duty cycle should be sufficiently low that the associated discharging current is small as compared to the available charging current. Finally, the charging capacitor should be large enough to present an impedance to the pulses which is negligible as compared with the load.

Gate circuits in accordance with the invention are especially useful in a system including a number of clock and counting circuits because their use makes the power demands upon the various triggering circuits so slight as to have a negligible effect upon the power consumption of the system. In addition, a single source of input signal pulses may be used which easily supplies the various triggering demands of a typical transistor computer with a total power consumption of less than 0.5 milliwatt.

Figure 3:
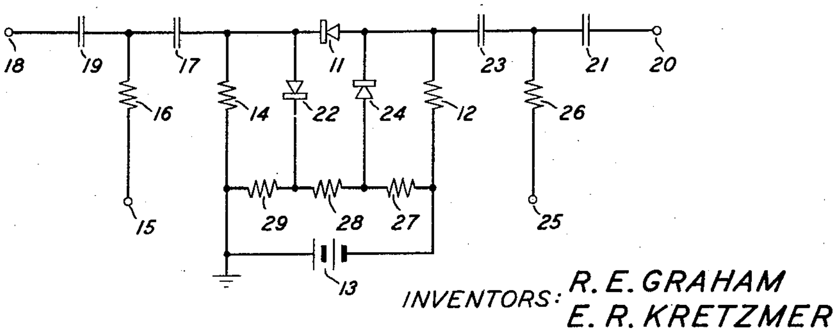
Fig. 3 is a circuit diagram in schematic form of a gate circuit in accordance with the invention as used in actual practice.

An embodiment of the invention as used in actual practice is shown in Fig. 3. The arrangement of Fig. 3 is a double control signal adaptation of the embodiment of Fig. 1. The circuit of Fig. 3 includes all of the elements of the circuit of Fig. 1 and in addition, a charging capacitor 23 connected between capacitor 21 and the junction of resistor 12 and diode 11, a diode 24 connected to the anode of diode 11, and a second control signal input terminal 25 connected to the junction of capacitors 23 and 21 through resistor 26. The gate circuit of Fig. 3 functions in the same manner as that of Fig. 1. However, the circuit of Fig. 3 has one advantage over that of Fig. 1 in that the control action may be performed by two oppositely phased one-volt signals instead of a single two-volt signal. The power saving resulting therefrom is obvious, particularly in the instance where the control signals are derived from a symmetrical flip flop. The diode 24 is biased to conduct very little current during the period of gate operation and to provide a low impedance current path to capacitor 23 for rapid cocking of the circuit.

While there are any number of possible values suitable for use in a circuit in accordance with the invention, the values used for the elements in the gate circuit shown in Fig. 3 are:

11—1N138—(Western Electric)
12—10 megohms
13—3 volts
14—10 megohms
16—0.1 megohm
17—0.25 microfarad
19—0.1 microfarad
21—0.1 microfarad
22—1N138 (Western Electric)
23—0.25 $\mu f$
24—1N138 (Western Electric)
26—0.1 megohm It is understood that the above-described arrangements are illustrative of the application of the principles of the invention. Numerous other arrangements may be devised by those skilled in the art without departing from the spirit and scope of the invention.

What is claimed is:

1. A gate circuit comprising a capacitor and an asymmetrically conducting device connected in series between an input terminal and an output terminal, a constant potential source including a positive pole and a negative pole, a first resistor for connecting said positive pole to the electrode of said asymmetrically conducting device and a second resistor for connecting said negative pole to the other electrode of said device to bias said device in one asymmetrically conducting state, means for applying a control signal to said device through said capacitor to bias said device in the other asymmetrically conducting state for a period determined by the charging rate of said capacitor through said first resistor, and means for applying to said input terminal a signal pulse of a frequency to insure that at least one pulse will occur during said period and of a pulse duty cycle sufficiently low that the average current thereof is small as compared to the current flow through said first resistor during said period whereby a pulse substantially equal to said signal pulse appears at said output terminal during said period.

2. A gate circuit comprising a capacitor and an asymmetrically conducting device connected in series between an input terminal and an output terminal, means for biasing said device in one asymmetrically conducting state, means for applying a signal pulse of one frequency to the plate of said capacitor connected to the input terminal, means for applying control signal pulses of a frequency less than said one frequency to said plate of said capacitor for biasing said device in the other asymmetrically conducting state, and means including said capacitor and a resistance connected to the junction of the other plate of said capacitor and said asymmetrically conducting device for making the period of time in which said device is in said other asymmetrically conducting state independent of the duration of a control signal pulse.

3. A gate circuit according to claim 2 wherein the means for biasing said device in one asymmetrically conducting state comprises a constant potential source and including a second asymmetrically conducting device connected between the junction of said other plate of said capacitor and said first mentioned asymmetrically conducting device and said constant potential source to provide a charging current path for said capacitor.

References Cited in the file of this patent

UNITED STATES PATENTS

| | | |
|---|---|---|
| 2,636,133 | Hussey | Apr. 21, 1953 |
| 2,685,039 | Scarbrough et al. | July 27, 1954 |